United States Patent
Rong et al.

(10) Patent No.: US 10,405,312 B2
(45) Date of Patent: Sep. 3, 2019

(54) SYSTEM AND METHOD FOR TRANSMISSIONS WITH FREQUENCY DIVERSITY

(71) Applicant: Futurewei Technologies, Inc., Plano, TX (US)

(72) Inventors: Zhigang Rong, San Diego, CA (US); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 117 days.

(21) Appl. No.: 15/209,094

(22) Filed: Jul. 13, 2016

(65) Prior Publication Data

US 2017/0026969 A1    Jan. 26, 2017

Related U.S. Application Data

(60) Provisional application No. 62/195,660, filed on Jul. 22, 2015.

(51) Int. Cl.
*H04B 7/12* (2006.01)
*H04L 5/00* (2006.01)
(Continued)

(52) U.S. Cl.
CPC .......... *H04W 72/0453* (2013.01); *H04B 7/12* (2013.01); *H04L 5/0007* (2013.01);
(Continued)

(58) Field of Classification Search
CPC .......... H04B 7/12; H04L 5/0007; H04L 7/12; H04W 72/04; H04W 72/0453;
(Continued)

(56) References Cited

U.S. PATENT DOCUMENTS

| 7,039,412 B2* | 5/2006 | Sandhu | H04L 1/0072 340/10.1 |
| 7,778,150 B2* | 8/2010 | Nakao | H04L 25/0206 370/208 |

(Continued)

FOREIGN PATENT DOCUMENTS

| CN | 1698285 A | 11/2005 |
| CN | 103746955 A | 4/2014 |

(Continued)

OTHER PUBLICATIONS

Cariou, et al., "High-efficiency WLAN", IEEE 802.11-13/0331r5, Mar. 2013, 21 pages.

(Continued)

*Primary Examiner* — Eric Nowlin
(74) *Attorney, Agent, or Firm* — Slater Matsil, LLP

(57) ABSTRACT

A method for transmitting with frequency diversity includes receiving scheduling information including a frequency diversity indication indicating usage of frequency diversity in a scheduled transmission, determining a first frequency resource and a second frequency resource in accordance with the scheduling information, and transmitting a first preamble and a first portion of a data payload over the first frequency resource and a second preamble and a second portion of the data payload over the second frequency resource.

23 Claims, 10 Drawing Sheets

(51) Int. Cl.
*H04W 72/04* (2009.01)
*H04W 72/12* (2009.01)
*H04W 84/12* (2009.01)

(52) U.S. Cl.
CPC .......... *H04L 5/0044* (2013.01); *H04L 5/0048* (2013.01); *H04L 5/0094* (2013.01); *H04W 72/12* (2013.01); *H04L 5/0023* (2013.01); *H04L 5/0064* (2013.01); *H04W 72/1289* (2013.01); *H04W 84/12* (2013.01)

(58) Field of Classification Search
CPC ............. H04W 72/12; H04W 72/1284; H04W 72/1289; H04W 74/004; H04W 84/12
See application file for complete search history.

(56) References Cited

U.S. PATENT DOCUMENTS

| | | | |
|---|---|---|---|
| 8,670,399 B2* | 3/2014 | Liu | H04L 5/001 370/329 |
| 8,811,312 B2* | 8/2014 | Seok | H04W 72/04 370/329 |
| 9,504,038 B2* | 11/2016 | Kasher | H04L 5/00 |
| 9,641,234 B2* | 5/2017 | Moon | H04B 7/0621 |
| 9,755,795 B2* | 9/2017 | Aboul-Magd | H04L 5/0007 |
| 9,838,513 B2* | 12/2017 | Doan | H04L 69/22 |
| 9,893,790 B2* | 2/2018 | Moon | H04B 7/0621 |
| 9,998,263 B2* | 6/2018 | Li | H04L 5/0037 |
| 10,004,081 B2* | 6/2018 | Sun | H04L 27/2613 |
| 10,027,450 B2* | 7/2018 | Rong | H04L 5/0007 |
| 10,149,209 B2* | 12/2018 | Lepp | H04W 72/1252 |
| 10,154,435 B2* | 12/2018 | Sutskover | H04L 5/0044 |
| 10,177,888 B2* | 1/2019 | Azizi | H04W 74/04 |
| 10,219,274 B2* | 2/2019 | Wang | H04W 72/0453 |
| 2004/0229650 A1 | 11/2004 | Fitton et al. | |
| 2007/0064592 A1* | 3/2007 | Nakao | H04L 25/0206 370/208 |
| 2007/0076784 A1 | 4/2007 | Zhou et al. | |
| 2011/0096747 A1* | 4/2011 | Seok | H04W 72/04 370/329 |
| 2011/0170011 A1 | 7/2011 | Choi et al. | |
| 2014/0211704 A1* | 7/2014 | Sampath | H04L 27/2613 370/329 |
| 2016/0088126 A1* | 3/2016 | Doan | H04L 69/22 370/329 |
| 2016/0095097 A1 | 3/2016 | Han et al. | |
| 2016/0164800 A1* | 6/2016 | Eitan | H04L 47/80 370/389 |
| 2016/0192363 A1* | 6/2016 | Kasher | H04L 5/00 370/329 |
| 2016/0315681 A1* | 10/2016 | Moon | H04B 7/0621 |
| 2016/0316473 A1* | 10/2016 | Wang | H04W 72/0453 |
| 2016/0323426 A1* | 11/2016 | Hedayat | H04W 28/0268 |
| 2017/0019891 A1* | 1/2017 | Rong | H04L 5/0007 |
| 2017/0048882 A1* | 2/2017 | Li | H04L 5/0037 |
| 2017/0064684 A1* | 3/2017 | Cariou | H04W 72/044 |
| 2017/0164241 A1* | 6/2017 | Kasher | H04L 5/00 |
| 2017/0171869 A1* | 6/2017 | Sun | H04L 27/2613 |
| 2017/0201305 A1* | 7/2017 | Moon | H04B 7/0621 |
| 2017/0265105 A1* | 9/2017 | Azizi | H04W 76/14 |
| 2017/0303208 A1* | 10/2017 | Suh | H04W 52/346 |
| 2017/0332286 A1* | 11/2017 | Lepp | H04W 72/1252 |
| 2017/0353276 A1* | 12/2017 | Aboul-Magd | H04L 5/0007 |
| 2017/0366329 A1* | 12/2017 | Cao | H04L 5/0005 |
| 2018/0007561 A1* | 1/2018 | Adachi | H04W 16/28 |
| 2018/0049240 A1* | 2/2018 | Kim | H04W 74/08 |
| 2018/0084501 A1* | 3/2018 | Mu | H04L 69/324 |
| 2018/0091632 A1* | 3/2018 | Doan | H04L 69/22 |
| 2018/0092117 A1* | 3/2018 | Azizi | H04W 76/27 |
| 2018/0098244 A1* | 4/2018 | Sutskover | H04L 5/0044 |
| 2018/0167137 A1* | 6/2018 | Azizi | H04B 7/2656 |
| 2018/0191545 A1* | 7/2018 | Liu | H04L 41/00 |
| 2019/0044674 A1* | 2/2019 | Li | H04L 5/0037 |

FOREIGN PATENT DOCUMENTS

| | | | | |
|---|---|---|---|---|
| EP | 2524517 A2 | 11/2012 | | |
| WO | WO-2009045135 A1 * | 4/2009 | ........... | H04L 5/0048 |
| WO | WO-2013116014 A1 * | 8/2013 | ........... | H04W 16/14 |
| WO | WO-2014117131 A1 * | 7/2014 | ......... | H04L 27/2613 |
| WO | 2017008635 A1 | 1/2017 | | |
| WO | WO-2017160774 A1 * | 9/2017 | .......... | H04W 28/065 |

OTHER PUBLICATIONS

Cariou, et al., "High-efficiency WLAN Straw poll", IEEE 802.11-13/0339r10, Mar. 2013, 7 pages.
Stacey, "Specification Framework for TGax", IEEE P802.11-15/0132r5, May 2015, 7 pages.
Hedayat, et al., "Frequency Diversity Options in OFDMA," IEEE802.11-15/0586r1, May 4, 2015, 12 pages.
Moon, et al., "Considerations on LTF Sequence Design," IEEE802.11-15/0584r0, May 10, 2015, 14 pages.
Adachi et al., "DL OFDMA Signalling," IEEE 802.11-15/0854r2, Jul. 13, 2015, 14 pages.

* cited by examiner

SYSTEM AND METHOD FOR TRANSMISSIONS WITH FREQUENCY DIVERSITY

CROSS-REFERENCE TO RELATED APPLICATIONS

This application claims the benefit of U.S. Provisional Application No. 62/195,660, filed Jul. 22, 2015, entitled "System and Method for Transmissions with Frequency Diversity," which application is hereby incorporated herein by reference.

TECHNICAL FIELD

The present invention relates generally to a system and method for digital communications, and, in particular embodiments, to a system and method for transmissions with frequency diversity.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards, also commonly referred to as WiFi. A popular deployment for WLANs is in an outdoor environment. An outdoor deployment presents a different environment than an indoor deployment with generally large and open coverage areas.

A newly formed IEEE 802.11 Study Group named "High Efficiency WLAN" (HEW) has been formed to study, among other things, improving system efficiency and area throughput, and improving real world performance in indoor and outdoor deployments in the presence of interfering sources and dense heterogeneous networks with moderate to heavy user loaded access points (APs). HEW's target usage scenario is a high density environment.

SUMMARY

Example embodiments provide a system and method for transmissions with frequency diversity.

In accordance with an example embodiment, a method for transmitting with frequency diversity is provided. The method includes receiving, by a communicating device, scheduling information including a frequency diversity indication indicating usage of frequency diversity in a scheduled transmission, determining, by the communicating device, a first frequency resource and a second frequency resource in accordance with the scheduling information, and transmitting, by the communicating device, a first preamble and a first portion of a data payload over the first frequency resource and a second preamble and a second portion of the data payload over the second frequency resource.

In accordance with an example embodiment, a method for communicating with frequency diversity is provided. The method includes transmitting, by a communicating device, scheduling information including a frequency diversity indication indicating usage of frequency diversity in a scheduled transmission occurring in a first frequency resource and a second frequency resource, and receiving, by the communicating device, a first preamble and a first portion of a data payload in the first frequency resource and a second preamble and a second portion of the data payload in the second frequency resource.

In accordance with an example embodiment, a communicating device is provided. The communicating device includes a processor, and a computer readable storage medium storing programming for execution by the processor. The programming including instructions to configure the communicating device to receive scheduling information including a frequency diversity indication indicating usage of frequency diversity in a scheduled transmission, determine a first frequency resource and a second frequency resource in accordance with the scheduling information, and transmit a first preamble and a first portion of a data payload over the first frequency resource and a second preamble and a second portion of the data payload over the second frequency resource.

In accordance with an example embodiment, a communicating device is provided. The communicating device includes a processor, and a computer readable storage medium storing programming for execution by the processor. The programming including instructions to configure the communicating device to transmit scheduling information including a frequency diversity indication indicating usage of frequency diversity in a scheduled transmission occurring in a first frequency resource and a second frequency resource, and receive a first preamble and a first portion of a data payload in the first frequency resource and a second preamble and a second portion of the data payload in the second frequency resource.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
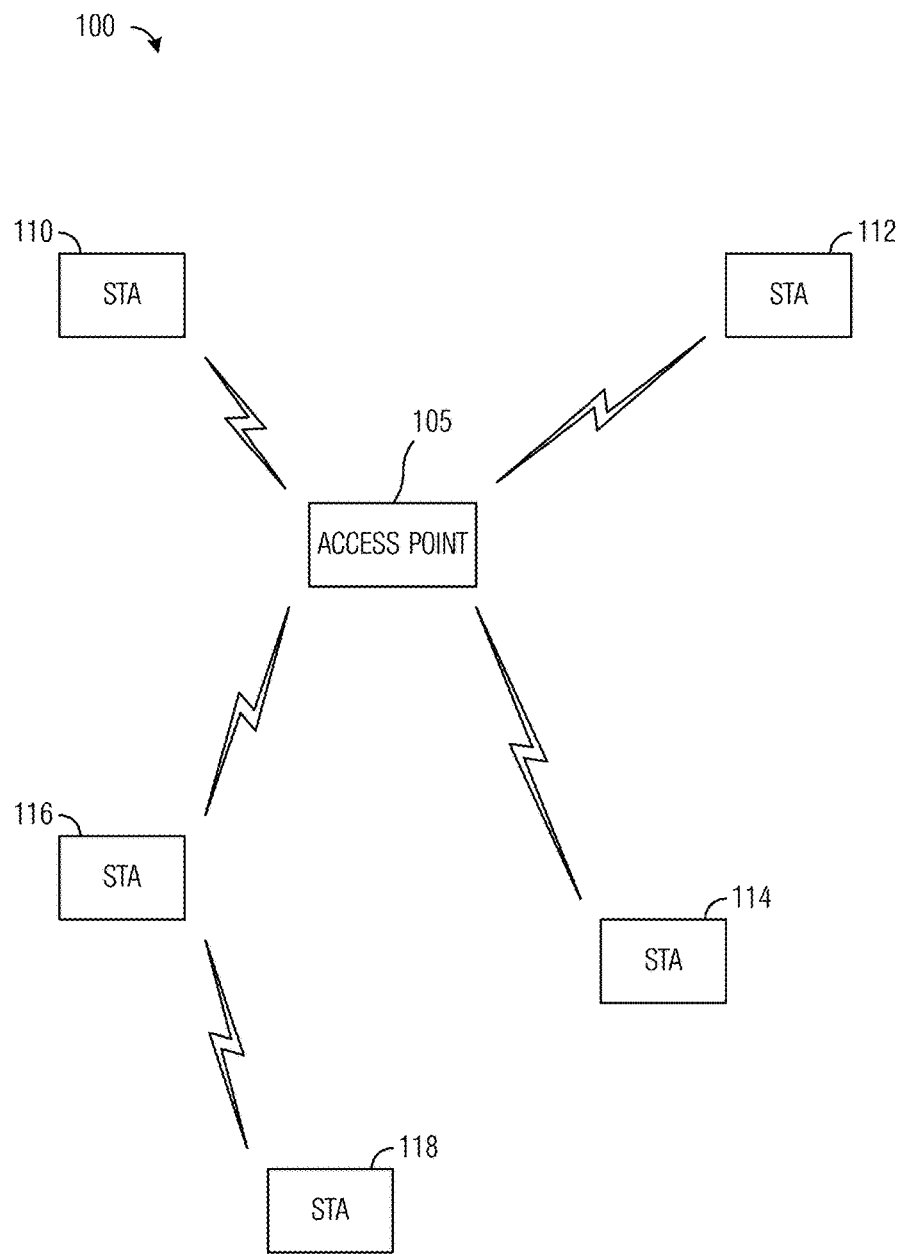
FIG. 1 is an example wireless communications system according to example embodiments described herein.

FIG. 1 illustrates an example wireless communications system 100. Wireless communications system 100 includes an access point (AP) 105 that serves one or more stations, such as stations (STA) 110-118, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. APs may also be commonly referred to as NodeBs, evolved NodeBs (eNBs), base stations, controllers, communications controllers, and the like. Stations may also be commonly referred to as mobile stations, mobiles, user equipment (UE), terminals, users, subscribers, and the like.

While it is understood that communications systems may employ multiple access points capable of communicating with a number of stations, only one access point and five stations are illustrated for simplicity.

Transmissions to and/or from a station occur on a shared wireless channel. WLANs make use of carrier sense multiple access with collision avoidance (CSMA/CA) to enable sharing of the wireless channel. With CSMA/CA, a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
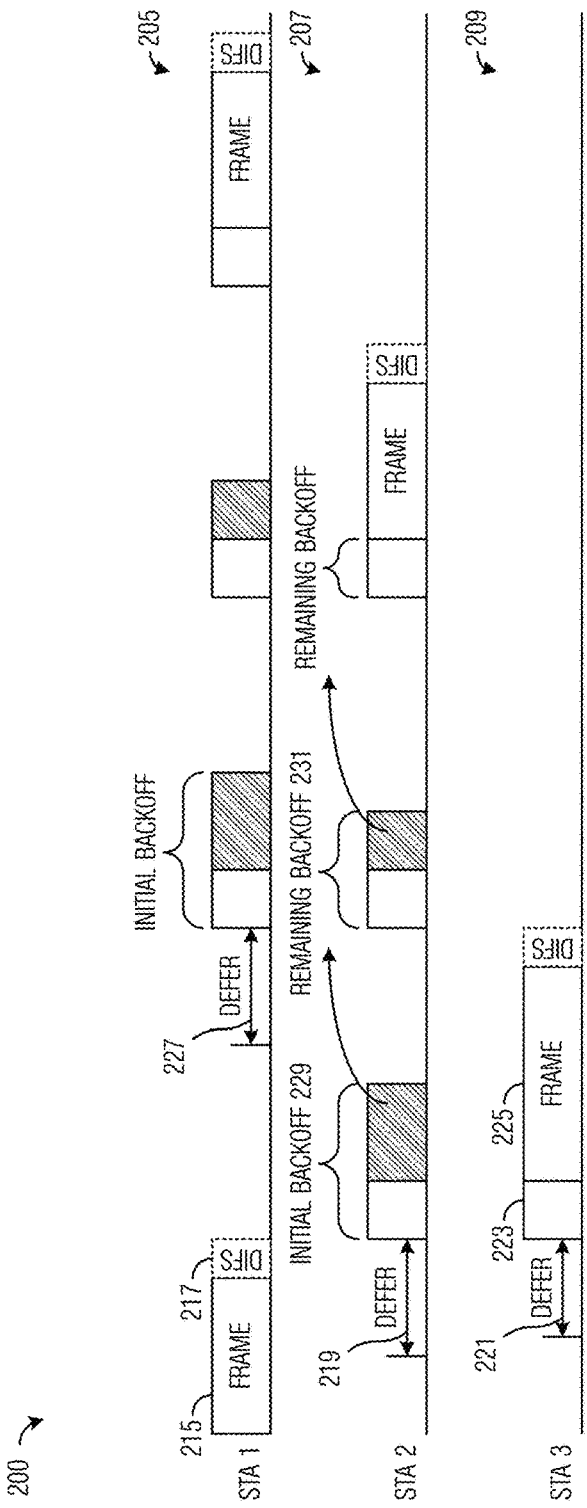
FIG. 2 is a diagram of channel access timing.

FIG. 2 illustrates a diagram 200 of channel access timing. A first trace 205 represents channel access for a first station (STA1), a second trace 207 represents channel access for a second station (STA2), and a third trace 209 represents channel access for a third station (STA3). A short inter-frame space (SIFS) has a duration of 16 microseconds, a point coordination function (PCF) inter-frame space (PIFS) has a duration of 25 microseconds, while a distributed coordination function (DCF) inter-frame space (DIFS) may last longer than either the SIFS or the PIFS. A backoff period may be a random duration. Therefore, active scanning may not provide the best solution when there are large numbers of stations attempting to perform AP/network discovery.

Orthogonal frequency division multiple access (OFDMA) has been adopted by Task Group ax (TGax) as a feature to improve communications system performance in a high density environment. In OFDMA, the entirety of the bandwidth of the communications system is divided into multiple resource units. As an illustrative example, according to TGax, for a communications system bandwidth of 20 MHz with a fast Fourier transform (FFT) size of 256, the bandwidth can be divided into 9 resource units with each resource unit having 26 tones. A data payload of a frame may be sent in one or more resource units. The bandwidth may be narrow, e.g., when only one resource unit is used the bandwidth is approximately 2 MHz.

A data payload of a frame may be sent in one or more resource units. As an illustrative example, for uplink (UL) OFDMA, information regarding the location of the resource unit(s) is indicated to the station from the AP in a trigger frame. After receiving the trigger frame, the station transmits its data packet in the assigned resource unit(s) as indicated in the trigger frame.

With the use of OFDMA, it is possible to concentrate the transmission power in a narrow band (e.g., 2 MHz). Therefore, interference from transmissions from an overlapping basic service set (OBSS) can be significant in some resource units. If the location of the resource unit(s) allocation remains constant during the transmission of the data packet, the transmission of the data packet may be subject to the same strong interference from the OBSS for the entire duration of the transmission of the data packet. Therefore, there is a need to provide frequency diversity in the OFDMA transmission of the data packet to enhance the robustness of the communications system.

In the Third Generation Partnership Project (3GPP) Long Term Evolution (LTE) series of technical standards, a resource block concept is introduced. In the resource block concept, the size of a resource block is fixed in a time domain (e.g., in terms of number of OFDM symbols) and in a frequency domain (e.g., in terms of number of tones). In 3GPP LTE, there is also a virtual resource block (VRB) pair with a first part of the VRB being located in a first slot of a subframe and a second part of the VRB being located in a second slot of a subframe. The first part and the second part can be at different locations in the frequency domain, thereby achieving frequency diversity gain.

In 3GPP LTE compliant communications systems, the reference signals used in the UL are self-contained within each slot. However, in Wi-Fi compliant communications systems, the reference signals (e.g., high efficiency short training field (HE-STF) and high efficiency long training field (HE-LTF)) are transmitted before the data payload, making it potentially difficult to split the data and transmit it in different frequency locations to achieve frequency diversity gain.

Providing frequency diversity in a Wi-Fi compliant communications system improves the robustness of the communications system and makes the communications system more tolerant to frequency selective interference.

Figure 3:
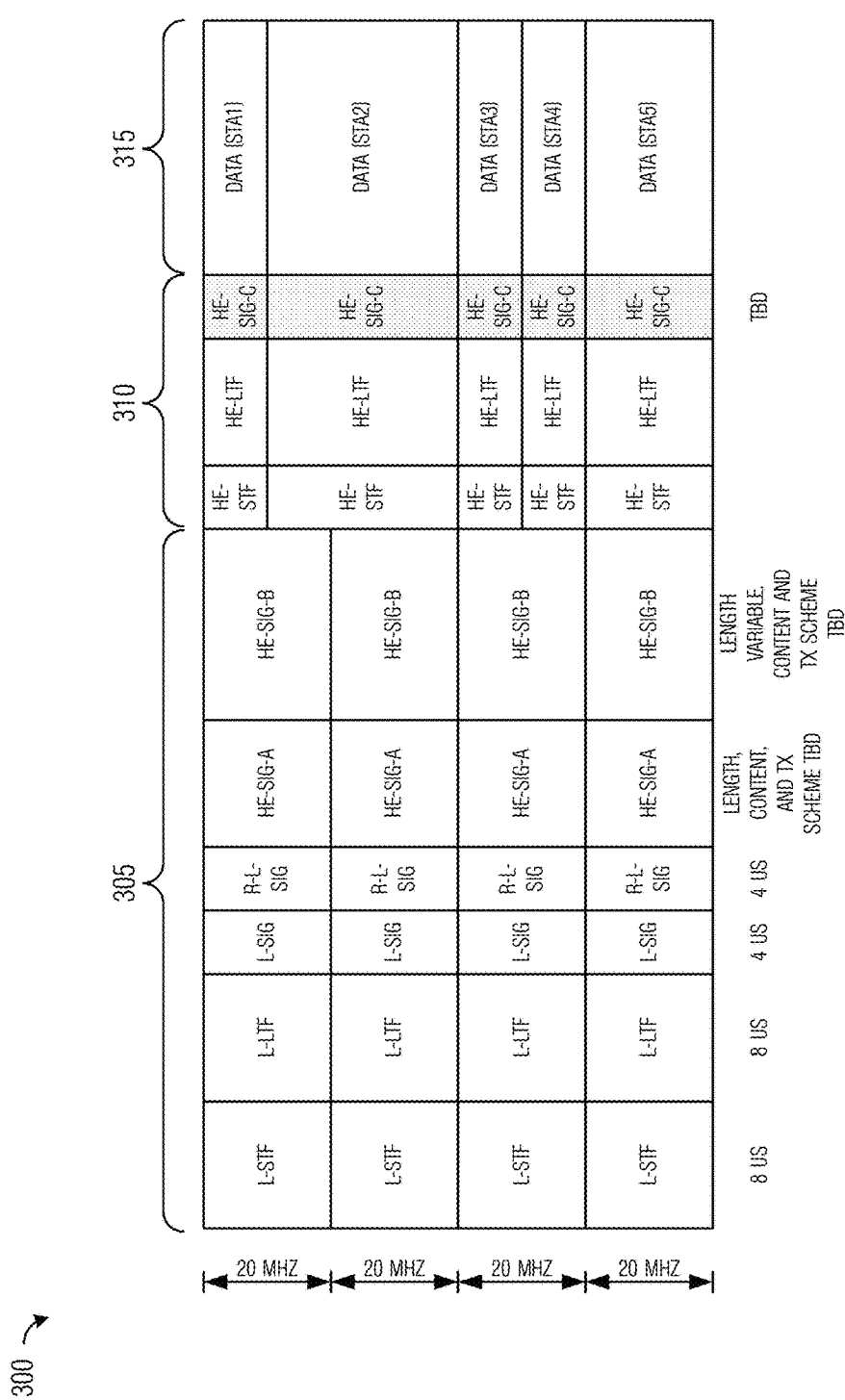
FIG. 3 is an example frame format of a TGax compliant communications system according to example embodiments described herein.

FIG. 3 illustrates an example frame format 300 of a TGax compliant communications system. Frame format 300 includes a first preamble portion 305 that includes preamble fields transmitted in bandwidths of 20 MHz in order to ensure compatibility with legacy devices. Frame format 300 also includes a second preamble portion 310 that includes preamble fields transmitted in different bandwidths and a data payload 315 that includes data transmitted in different bandwidths. As shown in FIG. 3, second preamble portion 310 is sent before data payload 315. This structure is independent of the bandwidth of data payload 315 with the reference signals occupying the same bandwidth as the corresponding data payload. In other words, the reference signals associated with a particular data payload occupy the same bandwidth as the data payload, but the bandwidths of different data payloads (and associated reference signals) may be different.

Figure 4:
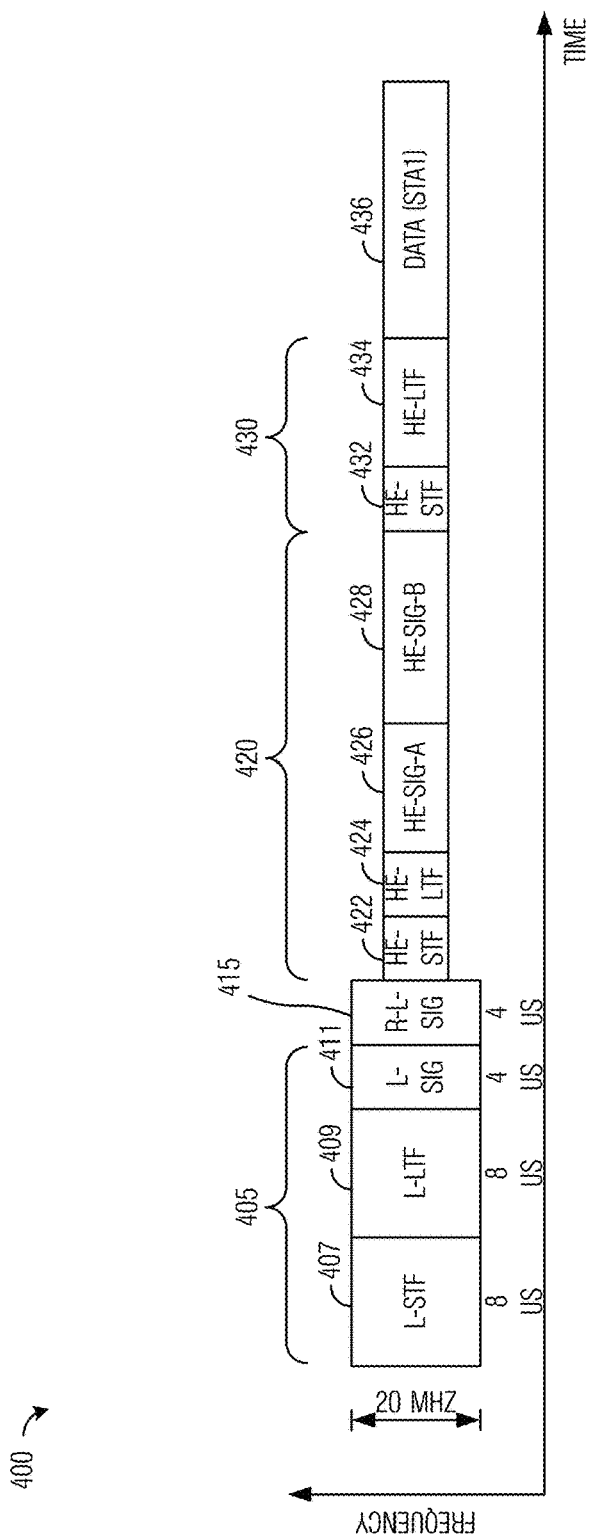
FIG. 4 illustrates an example frame according to example embodiments described herein.

FIG. 4 illustrates an example frame 400. Frame 400 includes a first preamble 405 (i.e., the legacy preamble with legacy short training field (L-STF) 407, legacy long training field (L-LTF) 409, and legacy signal (L-SIG) field 411) in a bandwidth of at least 20 MHz. Frame 400 also includes repeated L-SIG (R-L-SIG) 415 that is a repeated version of L-SIG 411 in a bandwidth of at least 20 MHz. Frame 400 also includes a second preamble 420 in a narrow bandwidth (e.g., one or more resource units, with each resource unit having 26 tones, for example). Second preamble 420 includes (but not limited to): training signals such as HE-STF 422 and HE-LTF 424; and control information such as a first high efficiency signal field (HE-SIG-A) 426 and optionally a second high efficiency signal field (HE-SIG-B) 426. Frame 400 also includes an additional preamble 430 followed by corresponding data payloads 436. Additional preamble 430 includes HE-STF 432 and HE-LTF 434.

According to an example embodiment, a station receives a frame including a frequency diversity indication that indicates whether or not the station is to use frequency diversity. If frequency diversity is to be used, the frame also includes at least some scheduling information to permit the station to determine the resources to use to make the transmission.

Figure 5:
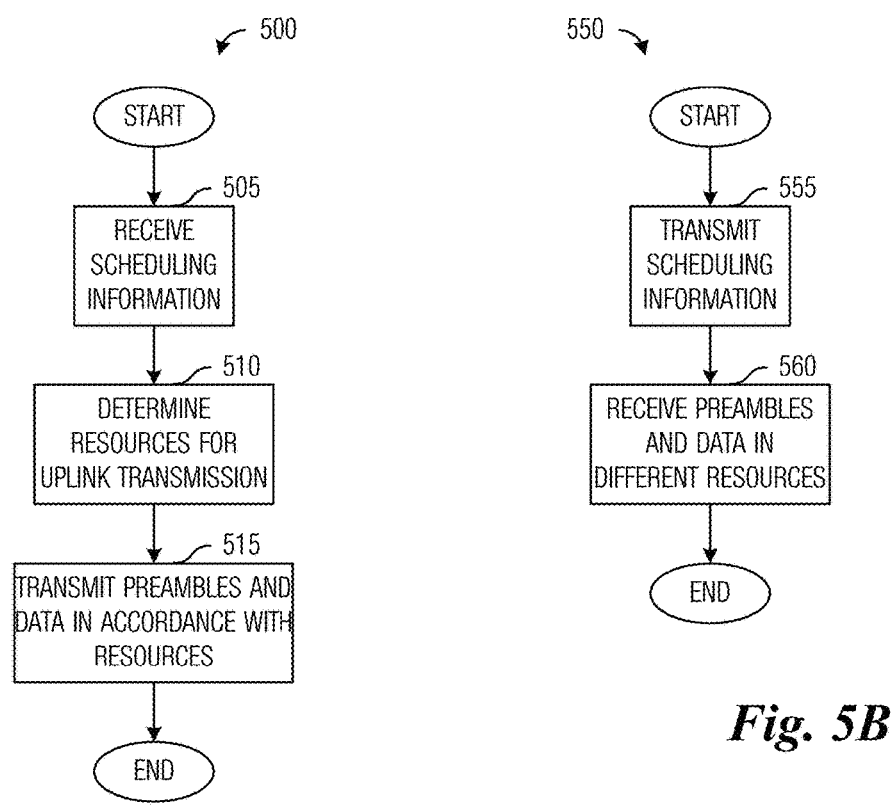
FIG. 5A illustrates a flow diagram of example operations occurring in a station transmitting an UL transmission with frequency diversity according to example embodiments described herein.
FIG. 5B illustrates a flow diagram of operations occurring in an AP receiving an UL transmission with frequency diversity according to example embodiments described herein.

FIG. 5A illustrates a flow diagram of example operations 500 occurring in a station transmitting an UL transmission with frequency diversity. Operations 500 may be indicative of operations occurring in a station as the station transmits an UL transmission with frequency diversity.

Operations 500 begin with the station receiving UL scheduling information about an UL transmission (block 505). The UL scheduling information may be indicated in a trigger frame from an AP serving the station. As an illustrative example, the trigger frame is a media access control (MAC) frame, where the UL scheduling information is carried in the MAC payload portion of the frame. As another illustrative example, the trigger frame is a physical layer (PHY) frame, where the UL scheduling information is carried in the PHY header portion of the frame. Other types of trigger frames are possible. The UL scheduling information includes resource allocation information for the UL transmission allocated to the station. The UL scheduling information includes a frequency diversity indication indicating that the UL transmission is to use frequency diversity. If frequency diversity is to be used, the UL scheduling information includes resource allocation information specifying two or more frequency resources used for the UL transmission. The UL scheduling information may include a starting time indication indicating one or more starting times when a current frequency resource used for the UL transmission should change to a new frequency resource. The UL scheduling information may include a combination of one or more of the resource allocation information and the starting time indication.

The station determines resources for the UL transmission (block 510). The station may determine the resources for the UL transmission directly from the UL scheduling information if the UL scheduling information includes all of the information required for frequency diversity operation. In other words, the UL scheduling information includes the resource allocation information and the starting time indication. Alternatively, if the UL scheduling information includes a subset of the information required for frequency diversity operation, the station may determine the resources for the UL transmission by combining the subset of the information required for frequency diversity operation and information derived from an application of one or more selection rules. As an illustrative example, selection rules may be used to determine starting times when a current frequency resource used for the UL transmission should change to a new frequency resource and/or frequency resources used for the UL transmission. A detailed discussion of the use of the UL scheduling information and/or selection rules to determine the resources for the UL transmission is provided below. The station transmits preambles and the data payload in accordance with the resources for the UL transmission (block 515).

FIG. 5B illustrates a flow diagram of operations 550 occurring in an AP receiving an UL transmission with frequency diversity. Operations 550 may be indicative of operations occurring in an AP as the AP receives an UL transmission with frequency diversity.

Operations 550 begin with the AP transmitting UL scheduling information to a station (block 555). The UL scheduling information may be sent in a trigger frame. The UL scheduling information may include a frequency diversity indication indicating that the UL transmission is to use frequency diversity, a starting time indication indicating one or more starting times when a current frequency resource used for the UL transmission should change to a new frequency resource, and resource allocation information including two or more frequency resources (when frequency diversity is to be used) used for the UL transmission. Alternatively, the UL scheduling information may include the frequency diversity indication and possibly none, one, or both of the starting time indication and the resource allocation information. The AP receives preambles and a data payload from the station in different resources (block 560). The different resources may be as specified in the UL scheduling information. Alternatively, the different resources may be derived from the UL scheduling information and information derived from an application of selection rules.

According to an example embodiment, the station determines resources for the UL transmission in accordance with the UL scheduling information. In other words, the UL scheduling information includes the information that the station may need to determine the resources to use for the UL transmission. The UL scheduling information includes a frequency diversity indication to indicate whether or not the station is to use frequency diversity. The frequency diversity indication may be a simple two-value indicator. If the frequency diversity indication indicates that the station is to use frequency diversity information, the UL scheduling information includes resource allocation information specifying two or more frequency resources the station is to use to transmit the UL transmission. The UL scheduling information also includes a starting time indication to indicate one or more starting times when the station is to stop using a current frequency resource for the UL transmission and change to a new frequency resource to continue the UL transmission. It is noted that the starting time corresponding to a first frequency resource does not need to be indicated because the station will commence transmission of the preamble and the data payload after completing the transmission of the legacy preamble and other preamble fields such as R-L-SIG and HE-SIG-A. So, for a situation where the station is to use N frequency resources, the starting time indication indicates N−1 starting times, where N is an integer value greater than or equal to 2.

Figure 6:
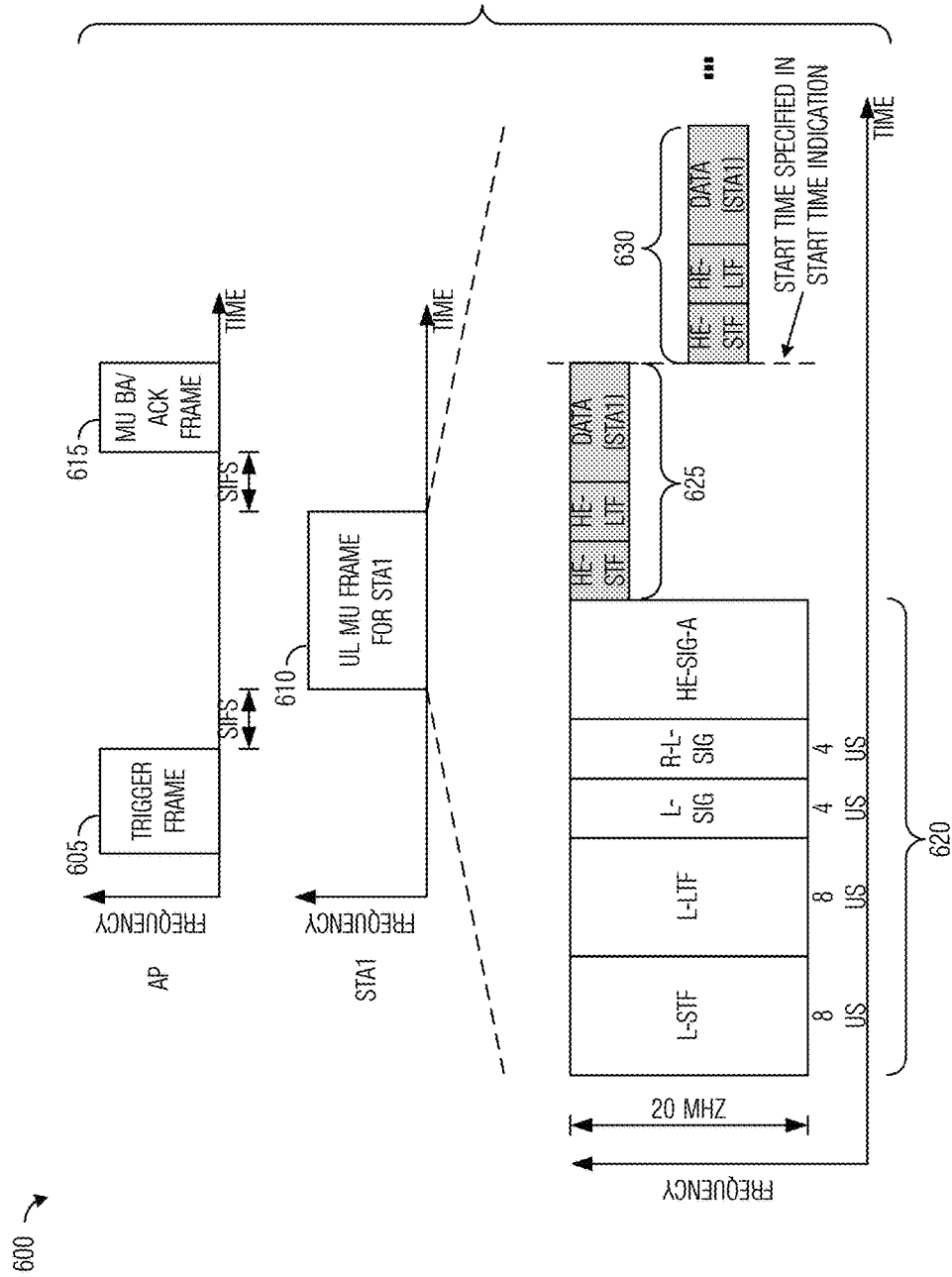
FIG. 6 illustrates a diagram of first example transmissions made by an AP and a station, wherein UL scheduling information includes information needed by the station to determine resources to use for an UL transmission according to example embodiments described herein.

FIG. 6 illustrates a diagram of first example transmissions 600 made by an AP and a station, wherein UL scheduling information includes information needed by the station to determine resources to use for an UL transmission. The diagram shown in FIG. 6 shows operation in a 20 MHz channel. However, the example embodiments presented herein are operable in bandwidths greater than or smaller than 20 MHz.

The AP transmits a trigger frame 605 including UL scheduling information (or an indication thereof) to the station. The UL scheduling information includes resource allocation information for one or more frequency resources for the UL transmission, wherein if frequency diversity is not to be used, the resource allocation information includes information for one frequency resource, while if frequency diversity is to be used, the resource allocation information includes information for two or more frequency resources. The UL scheduling information also includes a frequency diversity indication that indicates whether or not the station is to use frequency diversity. If the station is to use frequency diversity, the UL scheduling information also includes a starting time indication that indicates one or more starting times when the station is to stop using a current frequency resource for the UL transmission and change to a new frequency resource to continue the UL transmission.

The station determines the resources to use for the UL transmission from the UL scheduling information. The station transmits a UL multi-user (MU) frame 610. UL MU frame 610 includes a legacy preamble (e.g., L-STF, L-LTF, L-SIG), R-L-SIG, and control information in a HE-SIG-A in one or more 20 MHz channels (shown as span 620). UL MU frame 610 also includes training signals HE-STF and HE-LTF and a first portion of the data payload in a first frequency resource (shown as span 625). Span 625 starts at the end of span 620 and lasts until a starting time as specified in starting time indication. At the starting time (or at about the starting time) UL MU frame 610 also includes another set of training signals HE-STF and HE-LTF and a second portion of the data payload in a second frequency resource (shown as span 630). In other words, at a starting time as indicated in the starting time indicator, the station transmits another set of training signals (HE-STF and HE-LTF) and another portion of the data payload. If additional frequency resources are used, UL MU frame 610 includes additional spans similar to spans 625 and 630 located at the same or different frequency resources. As shown, UL MU frame 610 is an example highlighting the use of frequency diversity. If frequency diversity is not being used in the UL transmission, UL MU frame 610 will only include a single span, such as span 625, occurring in one frequency resource. Once UL MU frame 610 completes and the AP successfully receives the frame, the AP responds with a MU block acknowledgement (BA) frame or acknowledgement (ACK) frame 615.

According to an example embodiment, signaling overhead is reduced by eliminating some of the information indicated in the UL scheduling information carried in a trigger frame. Instead of explicitly indicating all of the information needed to support frequency diversity (i.e., frequency diversity indication, starting time indication, and resource allocation information), the starting time indication and/or the resource allocation information may be eliminated (or reduced) from the UL scheduling information. Although eliminated (or reduced) from the UL scheduling information, the station may be able to derive the missing information (the starting time indication and/or the resource allocation information) by applying one or more selection rules.

According to an example embodiment, the resource allocation information is reduced. Instead of including information for every frequency resource, the resource allocation information includes information for just an initial frequency resource (which is needed whether or not frequency diversity is used) and remaining frequency resources are derived by applying a selection rule.

Figure 7:
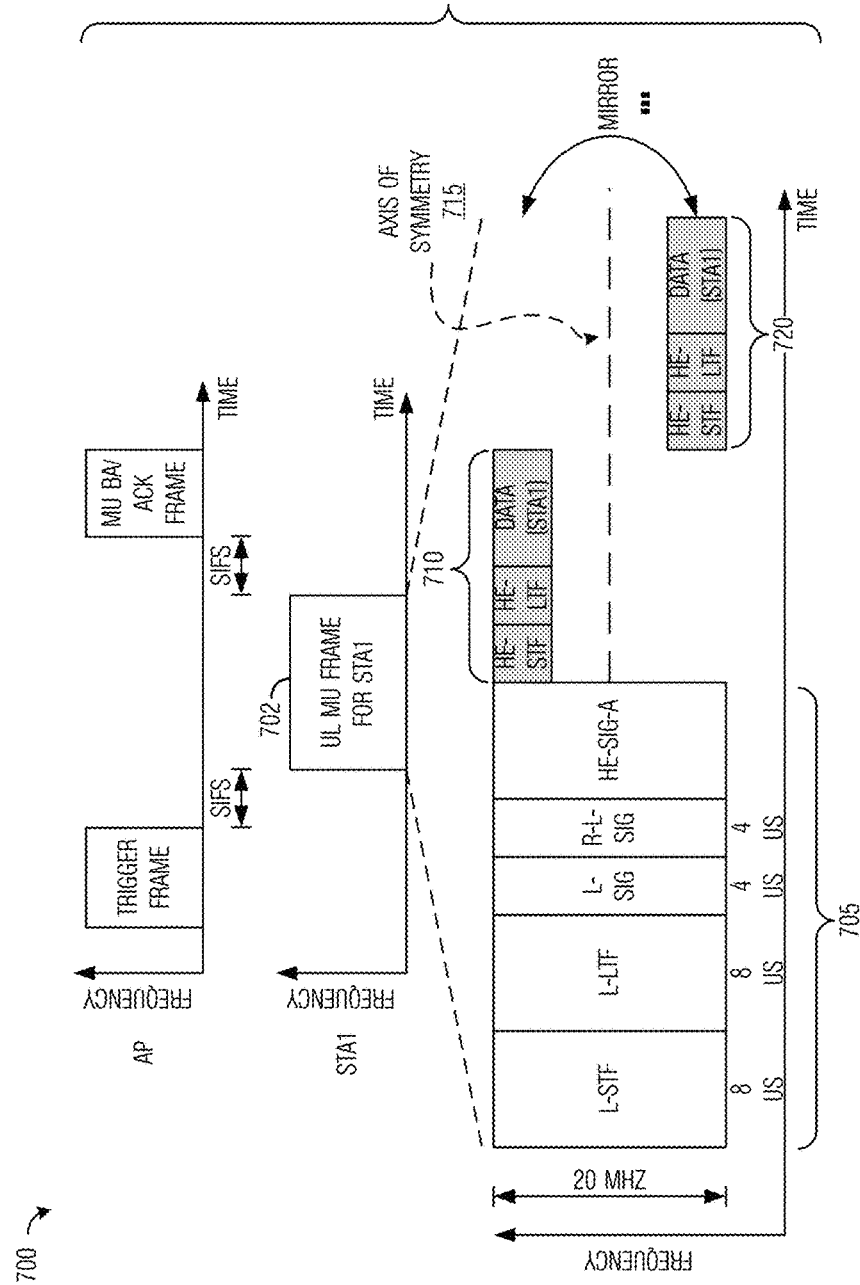
FIG. 7 illustrates a diagram of second example transmissions made by an AP and a station, wherein UL scheduling information includes abbreviated resource allocation information according to example embodiments described herein.

FIG. 7 illustrates a diagram of second example transmissions 700 made by an AP and a station, wherein UL scheduling information includes abbreviated resource allocation information. The diagram shown in FIG. 7 shows operation in a 20 MHz channel. However, the example embodiments presented herein are operable in bandwidths greater than or smaller than 20 MHz.

Because the resource allocation information is abbreviated and only includes an initial frequency resource, the station has to derive the one or more subsequent frequency resources by applying a selection rule. An example selection rule is to mirror the initial frequency resource about an axis of symmetry (e.g., a center of the channel). As shown in FIG. 7, a first span 705 of UL MU frame 702 includes a legacy preamble (e.g., L-STF, L-LTF, L-SIG), R-L-SIG, and control information in a HE-SIG-A in one or more 20 MHz channels. Frame 702 also includes a second span 710 (representing a first set of training signals and a first portion of the data payload transmitted in the initial frequency resource) that is followed by a third span 720 (representing a second set of training signals and a second portion of the data payload transmitted in a second frequency resource) wherein the second frequency resource is a mirror of the initial frequency resource about an axis of symmetry 715. UL MU frame 702 may include additional spans, similar to spans 710 and 720, if more than two frequency resources are used. These additional spans may occur at the same or different frequency resources. As an example, the initial and second frequency resources are repeated. As another example, subsequent frequency resources may be derived using additional selection rules, such as shifting frequency resources and then mirroring, and so forth.

Figure 8:
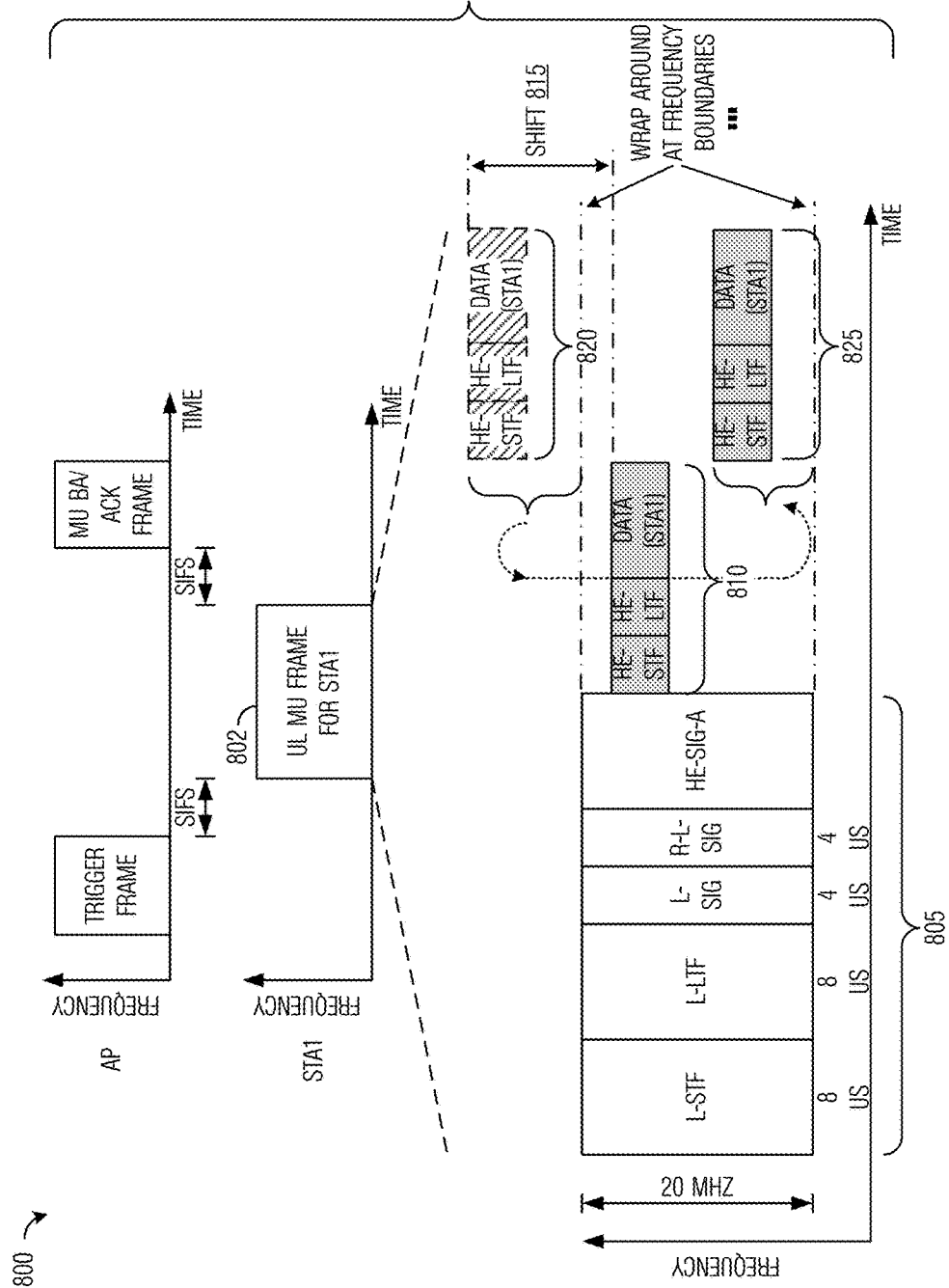
FIG. 8 illustrates a diagram of third example transmissions made by an AP and a station, wherein UL scheduling information includes abbreviated resource allocation information according to example embodiments described herein.

FIG. 8 illustrates a diagram of third example transmissions 800 made by an AP and a station, wherein UL scheduling information includes abbreviated resource allocation information. The diagram shown in FIG. 8 shows operation in a 20 MHz channel. However, the example embodiments presented herein are operable in bandwidths greater than or smaller than 20 MHz.

Because the resource allocation information is abbreviated and only includes an initial frequency resource, the station has to derive the one or more subsequent frequency resources by applying a selection rule. An example selection rule is to apply a shift to the initial frequency resource. If the shift moves a subsequent frequency resource outside of a range of possible frequency resources (i.e., the subsequent frequency resource is outside of the frequency boundaries of the channel), the resulting frequency resource is wrapped around the frequency boundaries of the channel. In other words, a modulo function is applied to the subsequent frequency resource to move it back into the channel. Furthermore, if more than one shift is needed (i.e., when more than two frequency resources are used), the same shift, different shifts, same shift with different modulo functions, or different shifts with different modulo functions may be used to determine subsequent frequency resources.

The amount of the shift may be specified by a technical standard or set by an operator of the communications system. The amount of the shift may be indicated in a Beacon Frame as system information or in a trigger frame.

As shown in FIG. 8, a first span 805 of UL MU frame 802 includes a legacy preamble (e.g., L-STF, L-LTF, L-SIG), R-L-SIG, and control information in a HE-SIG-A in one or more 20 MHz channels. UL MU frame 802 also includes a second span 810 (representing a first set of training signals and a first portion of the data payload transmitted in the initial frequency resource). At a time indicated by the UL scheduling information or determined by the station, second span 810 ends. The frequency resource of second span 810 is shifted by shift 815, resulting in a frequency resource for a third span 820 (representing a second set of training signals and a second portion of the data payload transmitted in a second frequency resource). However, the frequency resource for third span 820 is outside of the channel, so the frequency resource for third span 820 is wrapped around the frequency boundaries of the channel to bring it back into the channel, resulting in a new frequency resource for a fourth span 825 (representing the second set of training signals and the second portion of the data payload transmitted in a second frequency resource that is inside the channel). UL MU frame 802 may include additional spans, similar to spans 810 and 825, if more than two frequency resources are used. These additional spans may occur at the same or different frequency resources after application of shift 815 and wrap around (if needed).

According to an example embodiment, the resource allocation information is reduced. Instead of including information for every starting time in a starting time indication, the starting time indication is omitted and the one or more starting times are derived by applying a selection rule.

Figure 9:
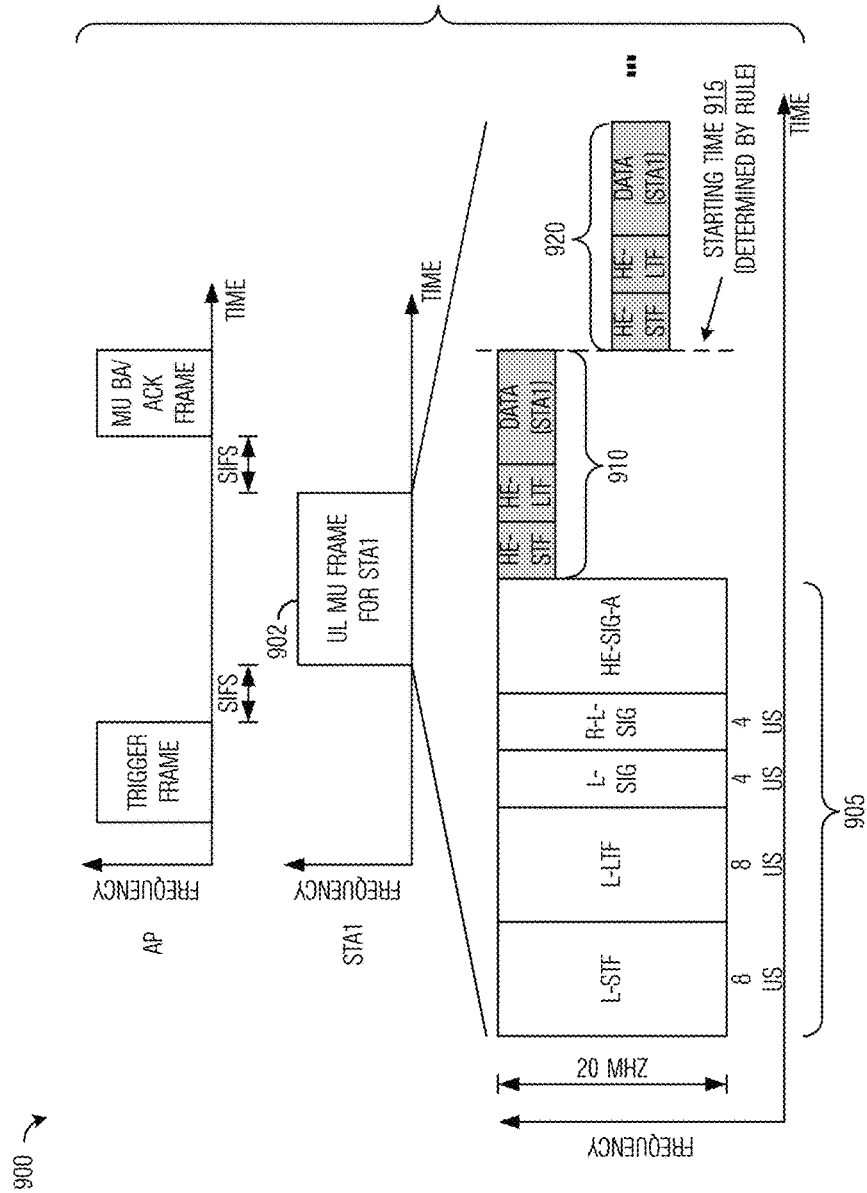
FIG. 9 illustrates a diagram of third example transmissions made by an AP and a station, wherein UL scheduling information omits a starting time indication according to example embodiments described herein.

FIG. 9 illustrates a diagram of third example transmissions 900 made by an AP and a station, wherein UL scheduling information omits a starting time indication. The diagram shown in FIG. 9 shows operation in a 20 MHz channel. However, the example embodiments presented herein are operable in bandwidths greater than or smaller than 20 MHz.

Because the starting time indication indicating one or more starting times for when a current frequency resource used for the UL transmission should change to a new frequency resource, the station has to derive the one or more starting times by applying a selection rule. An example selection rule is to divide the data payload into a specified number of groups of OFDM symbols and to derive the one or more starting times by determining the amount of time to transmit the training signals (the HE-STF and the HE-LTF) plus one group of OFDM symbols. As an illustrative example, let the data payload be N OFDM symbols in length and the data payload is to be divided into 2 groups of OFDM symbols, i.e., the first group having N/2 OFDM symbols when N is even and having (N+1)/2 OFDM symbols (or (N−1)/2 OFDM symbols) when N is odd. Therefore, the starting time for the second group of OFDM symbols is equal to the time of the end of the legacy preamble (e.g., L-STF, L-LTF, L-SIG), R-L-SIG, and control information in a HE-SIG-A plus the time to transmit the training signals (the HE-STF and the HE-LTF) plus the first group of OFDM symbols.

As shown in FIG. 9, a first span 905 of UL MU frame 902 includes a legacy preamble (e.g., L-STF, L-LTF, L-SIG), R-L-SIG, and control information in a HE-SIG-A in one or more 20 MHz channels. UL MU frame 902 also includes a second span 910 (representing a first set of training signals and a first portion of the data payload transmitted in the initial frequency resource) is followed by a third span 920 (representing a second set of training signals and a second portion of the data payload transmitted in a second frequency resource) wherein third span 920 starts at starting time 915 that is derived from a selection rule. UL MU frame 902 may include additional spans, similar to spans 910 and 920, if more than two frequency resources are used. These additional spans may occur at the same or different frequency resources and start at times derived from the selection rule.

According to an example embodiment, the one or more starting times are specified by a technical standard or by an operator of the communications system. As an example, the starting times correspond to the amount of time needed to transmit a fixed sized group of OFDM symbols (plus the training signals). As another example, the starting times correspond to a fixed amount of time to transmit OFDM symbols.

According to an example embodiment, the signaling overhead associated with the trigger frame is reduced by both omitting the starting time indication and reducing the resource allocation information.

Figure 10:
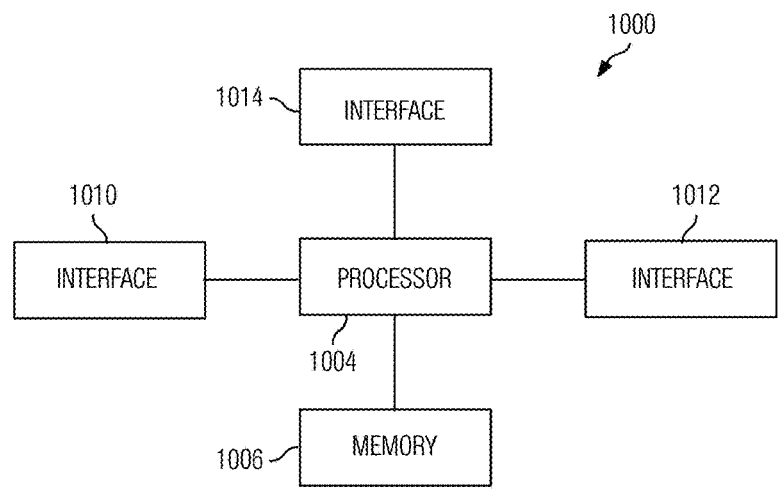
FIG. 10 illustrates a block diagram of an embodiment processing system for performing methods described herein.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
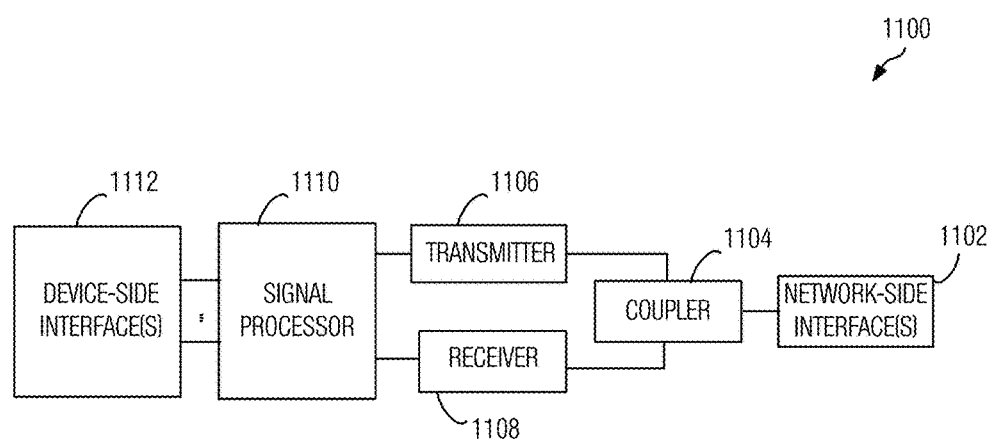
FIG. 11 illustrates a block diagram of a transceiver adapted to transmit and receive signaling over a telecommunications network according to example embodiments described herein.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a mirroring unit/module, a shifting unit/module, an arithmetic unit/module, and/or a setting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting with frequency diversity, the method comprising:
    wirelessly receiving, by a communicating device, scheduling information including a frequency diversity indication indicating usage of frequency diversity in a scheduled transmission;
    determining, by the communicating device, a first frequency resource and a second frequency resource in accordance with the scheduling information;
    wirelessly transmitting, by the communicating device, a first preamble followed by a first portion of a data payload over the first frequency resource, without transmitting any preamble or data over the second frequency resource; and
    wirelessly transmitting, by the communicating device after transmitting the first preamble and the first portion of the data payload, a second preamble followed by a second portion of the data payload over the second frequency resource, without transmitting any preamble or data over the first frequency resource, the first preamble, the first portion of the data payload, the second preamble and the second portion of the data payload being in a same frame.

2. The method of claim 1, wherein the scheduling information identifies locations of the first frequency resource and the second frequency resource.

3. The method of claim 1, wherein the scheduling information identifies a first location of the first frequency resource without identifying a second location of the second frequency resource, and wherein determining the first frequency resource and the second frequency resource comprises:
    determining, by the communicating device, the first frequency resource in accordance with the scheduling information; and
    mirroring, by the communicating device, the first frequency resource about an axis of symmetry to determine the second frequency resource.

4. The method of claim 1, wherein the scheduling information identifies a first location of the first frequency resource without identifying a second location of the second frequency resource, and wherein determining the first frequency resource and the second frequency resource comprises:
    determining, by the communicating device, the first frequency resource in accordance with the scheduling information; and
    shifting, by the communicating device, the first frequency resource to determine the second frequency resource.

5. The method of claim 4, wherein determining the first frequency resource and the second frequency resource further comprises: applying, by the communicating device, a modulo function to the shifted first frequency resource to convert the shifted first frequency resource to the second frequency resource, in response to the shifted first frequency resource being outside of a frequency range of a channel used by the communicating device to transmit the data payload.

6. The method of claim 1, further comprising determining, by the communicating device, a starting time in accordance with the scheduling information, wherein transmission of the second preamble followed by the second portion of the data payload begins at the starting time.

7. The method of claim 6, wherein determining the starting time comprises:
    determining, by the communicating device, a number of orthogonal frequency division multiplexed (OFDM) symbols in the data payload; and
        setting, by the communicating device, the starting time to be equal to a first time corresponding to a beginning of the first preamble plus a second time for transmitting the first preamble and N/2 OFDM symbols in response to the number of OFDM symbols in the data payload being even, where N is the number of OFDM symbols in the data payload; or
        setting, by the communicating device, the starting time to be equal to the first time corresponding to the beginning of the first preamble plus the second time for transmitting the first preamble and (N+1)/2 OFDM symbols in response to the number of OFDM symbols in the data payload being odd.

8. The method of claim 1, wherein transmitting the first preamble and the first portion of the data payload in the first frequency resource and the second preamble and the second portion of the data payload in the second frequency resource comprises:
    transmitting, by the communicating device, the first preamble and the first portion of the data payload in the first frequency resource in a first time; and
    transmitting, by the communicating device, the second preamble and the second portion of the data payload in the second frequency resource in a second time.

9. The method of claim 8, wherein the scheduling information further identifies the first time, and wherein the method further comprises determining, by the communicating device, the second time in accordance with a selection rule.

10. A method for communicating with frequency diversity, the method comprising:
    wirelessly transmitting, by a communicating device, scheduling information including a frequency diversity indication indicating usage of frequency diversity in a scheduled transmission occurring in a first frequency resource and a second frequency resource;
    wirelessly receiving, by the communicating device from a station, a first preamble followed by a first portion of a data payload in the first frequency resource, without receiving any preamble or data from the station in the second frequency resource; and
    wirelessly receiving, by the communicating device from the station after receiving the first preamble and the first portion of the data payload, a second preamble followed by a second portion of the data payload in the second frequency resource, without receiving any preamble or data from the station in the first frequency resource, the first preamble, the first portion of the data payload, the second preamble and the second portion of the data payload being in a same frame.

11. The method of claim 10, wherein the scheduling information identifies locations of the first frequency resource and the second frequency resource.

12. The method of claim 10, wherein the scheduling information identifies a first location of the first frequency resource without identifying a second location of the second frequency resource, and wherein the scheduling information is configured to prompt a determining of the second location of the second frequency resource by mirroring the first frequency resource about an axis of symmetry.

13. The method of claim 10, wherein the scheduling information identifies a first location of the first frequency resource without identifying a second location of the second frequency resource, and wherein the scheduling information is configured to prompt a determining of the second location of the second frequency resource by shifting the first frequency resource.

14. The method of claim 10, wherein the scheduling information identifies a starting time indicating a transmission time for the second preamble followed by the second portion of the data payload.

15. A communicating device comprising:
    a non-transitory memory storage comprising instructions; and
    a processor in communication with the non-transitory memory storage, wherein the processor executes the instructions to:
        wirelessly receive scheduling information including a frequency diversity indication indicating usage of frequency diversity in a scheduled transmission,
        determine a first frequency resource and a second frequency resource in accordance with the scheduling information,
        wirelessly transmit a first preamble followed by a first portion of a data payload over the first frequency resource, without transmitting any preamble or data over the second frequency resource; and
        wirelessly transmit, after transmitting the first preamble and the first portion of the data payload, a second preamble followed by a second portion of the data payload over the second frequency resource, without transmitting any preamble or data over the first frequency resource, wherein the first preamble, the first portion of the data payload, the second preamble and the second portion of the data payload are in a same frame.

16. The communicating device of claim 15, wherein the scheduling information identifies a first location of the first frequency resource without identifying a second location of the second frequency resource, and wherein the processor executes the instructions to:
    determine the first frequency resource in accordance with the scheduling information, and
    mirror the first frequency resource about an axis of symmetry to determine the second frequency resource.

17. The communicating device of claim 15, wherein the scheduling information identifies a first location of the first frequency resource without identifying a second location of the second frequency resource, and wherein the processor executes the instructions to:
    determine the first frequency resource in accordance with the scheduling information, and
    shift the first frequency resource to determine the second frequency resource.

18. The communicating device of claim 15, wherein the processor executes the instructions to:
   determine a number of orthogonal frequency division multiplexed (OFDM) symbols in the data payload, and
      set a starting time to be equal to a first time corresponding to a beginning of the first preamble plus a second time for transmitting the first preamble and N/2 OFDM symbols in response to the number of OFDM symbols in the data payload being even, where N is the number of OFDM symbols in the data payload, or
      set the starting time to be equal to the first time corresponding to the beginning of the first preamble plus the second time for transmitting the first preamble and (N+1)/2 OFDM symbols in response to the number of OFDM symbols in the data payload being odd.

19. The communicating device of claim 15, wherein the processor executes the instructions to:
   transmit the first preamble and the first portion of the data payload in the first frequency resource in a first time, and
   transmit the second preamble and the second portion of the data payload in the second frequency resource in a second time.

20. A communicating device comprising:
   a non-transitory memory storage comprising instructions; and
   a processor in communication with the non-transitory memory storage, wherein the processor executes the instructions to:
      wirelessly transmit scheduling information including a frequency diversity indication indicating usage of frequency diversity in a scheduled transmission occurring in a first frequency resource and a second frequency resource,
      wirelessly receive, from a station, a first preamble followed by a first portion of a data payload in the first frequency resource, without receiving any preamble or data from the station in the second frequency resource; and
      wirelessly receive, from the station after receiving the first preamble and the first portion of the data payload, a second preamble followed by a second portion of the data payload in the second frequency resource, without receiving any preamble or data from the station in the first frequency resource, wherein the first preamble, the first portion of the data payload, the second preamble and the second portion of the data payload are in a same frame.

21. The communicating device of claim 20, wherein the scheduling information identifies locations of the first frequency resource and the second frequency resource.

22. The communicating device of claim 20, wherein the scheduling information identifies a first location of the first frequency resource without identifying a second location of the second frequency resource, and wherein the scheduling information is configured to prompt a determining of the second location of the second frequency resource by mirroring the first frequency resource about an axis of symmetry.

23. The communicating device of claim 20, wherein the scheduling information identifies a first location of the first frequency resource without identifying a second location of the second frequency resource, and wherein the scheduling information is configured to prompt a determining of the second location of the second frequency resource by shifting the first frequency resource.

* * * * *